No. 645,818. Patented Mar. 20, 1900.
A. LINDGREN.
DISK HARROW.
(Application filed Dec. 14, 1899.)

(No Model.) 2 Sheets—Sheet 1.

Witnesses: Inventor:
August Lindgren
By P. T. Dodge
Atty.

No. 645,818. Patented Mar. 20, 1900.
A. LINDGREN.
DISK HARROW.
(Application filed Dec. 14, 1899.)
(No Model.) 2 Sheets—Sheet 2.

Witnesses:
F. A. Elmore
N. R. Kennedy

Inventor:
August Lindgren
By P. F. Dodge
Atty.

UNITED STATES PATENT OFFICE.

AUGUST LINDGREN, OF MOLINE, ILLINOIS, ASSIGNOR TO THE MOLINE PLOW COMPANY, OF ILLINOIS.

DISK HARROW.

SPECIFICATION forming part of Letters Patent No. 645,818, dated March 20, 1900.

Application filed December 14, 1899. Serial No. 740,248. (No model.)

*To all whom it may concern:*

Be it known that I, AUGUST LINDGREN, of Moline, county of Rock Island, and State of Illinois, have invented a new and useful Improvement in Disk Harrows, of which the following is a specification.

This invention has reference to disk harrows, and relates more particularly to the scraping devices for freeing the disks of any adhering matters.

The invention consists of an improved means of mounting and sustaining the scrapers, so that by the operation of a foot or other lever they may be swung in a gang from the centers of the disks to the peripheries to the end that every portion of the disk in its rotation may be cleaned.

Figure 1:
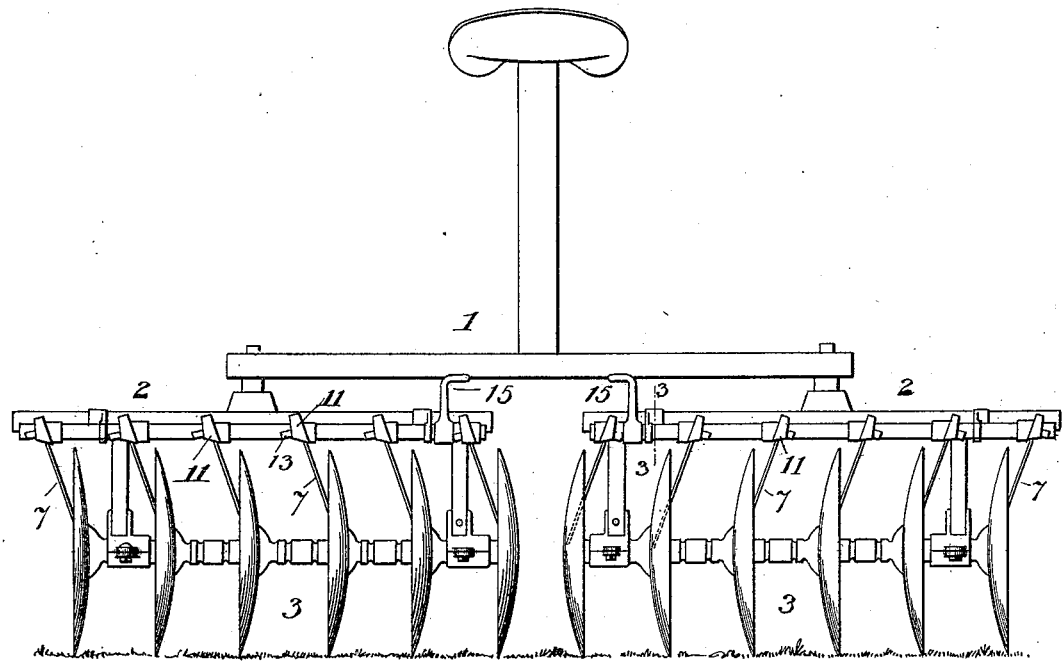
Figure 3:
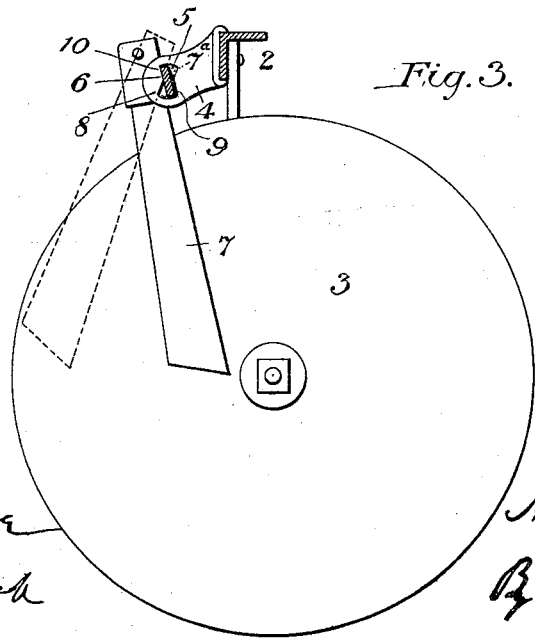
Figure 4:
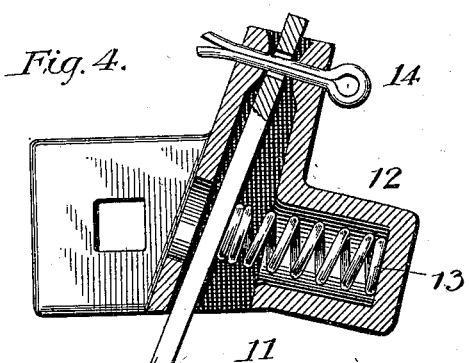
Figure 2:
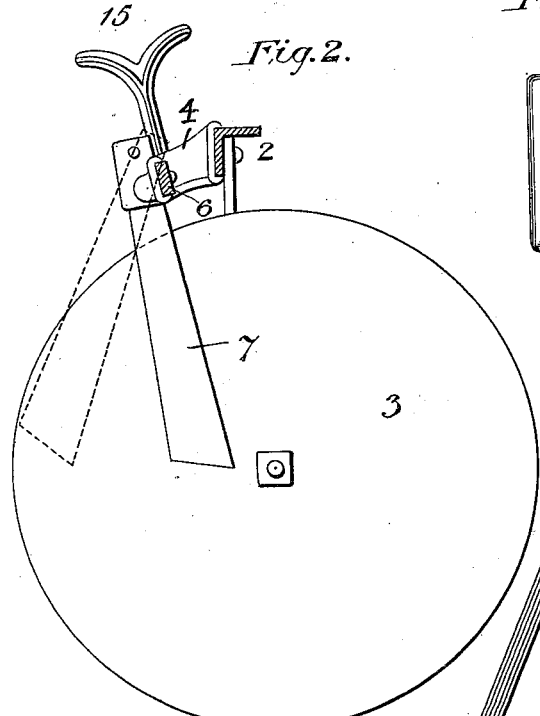
Figure 6:
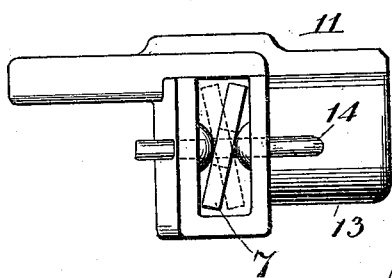
Figure 5:
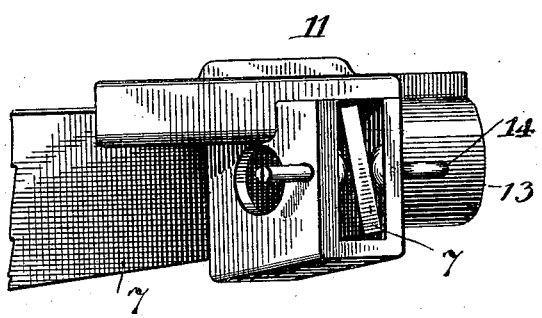

In the accompanying drawings, Figure 1 is a rear elevation of a disk harrow having my improved invention applied thereto. Fig. 2 is a transverse sectional elevation of the same. Fig. 3 is a transverse sectional elevation through the rocking bar carrying the scrapers, showing in elevation the bearing for the bar. Fig. 4 is a sectional elevation, on an enlarged scale, of one of the scraper-blades and its socket or holder. Fig. 5 is a top perspective view of the same, showing how the blade may be rocked or tipped in its holder on a longitudinal axis passing through the blade. Fig. 6 is a top plan view of the parts shown in the preceding figure with the blade tipped in the opposite direction.

Referring to the drawings, 1 represents a frame to which are connected two horizontal bars 2, preferably of angle-iron, arranged end to end and sustaining beneath them two gangs of rotary cutting-disks 3, which in the present instance are dished or curved inward and mounted to revolve on axes extending parallel with the bars 2, as usual in machines of this character. Near its opposite ends each bar has bolted to its rear faces brackets 4, each having an opening 5 therein to receive a rocking bar 6, to which are connected at intervals, as will be more fully described hereinafter, a series of scraper-blades 7, one for each disk, which blades have their active lower ends in such position that when the bar is rocked they will be moved back and forth from the center of the disk to its periphery. The opening in the bracket is contracted at its center and widened at top and bottom, where its ends are curved, so that the rocking bar is permitted to rock only to a limited extent, the forward motion of the bar being limited by the forward upper wall 7ª of the opening and the lower rear wall 8, and the motion of the bar in the opposite direction being limited by the forward lower wall 9 and the upper rear wall 10 of the opening. The size, form, and arrangement of the several parts is such that when the rocking bar is in its rear position, as shown in Fig. 3, the active ends of the blades will be adjacent to the center of the disks, and when the bar is in its forward position, as shown by dotted lines in said figure, the ends of the blades will be near or at the peripheries of the disks. It is seen, therefore, that by the peculiar form of the opening in the bracket the rocking bar is afforded a firm bearing and at the same time limited in its rocking motion, so that there is no danger of the active ends of the blades moving inward beyond the center of the disks or outward beyond their peripheries.

The scraper-blades are preferably of flat steel and connected with the rocking bar in such manner that they may move independently to a limited extent to and from the disk in the line of the axes of the latter and may also rock or trip independently around their longitudinal axes. The first motion permits the blade to lie at all times in contact with the face of the disk, whether adjusted at its center or at its periphery, while the second motion permits the end of the blade to lie flatly against the disk at whatever point between the center and its periphery. To effect this result, each blade has its upper end inserted in an opening or socket in holders 11 in the form of castings bolted at intervals on the rear face of the rocking bars, as clearly shown in Fig. 1. The opening in each holder is widest at its bottom, and at its upper end is considerably wider than the thickness of the blade, so that the latter may move in the opening to a limited extent both in the direction of the axes of the disks and also around the longitudinal axis of the blade, as indicated in Fig. 5. The two walls of the opening in the holder diverge, and both incline downward and outward toward its disk in order that the active ends of the blades may occupy the proper relative positions with respect to the disks and be properly limited in the independent motions described. The inner wall of each opening is formed with an integral lateral tubular socket 12, communicating with the opening, and in the sockets are seated spiral springs 13, which bear against the side of the blades and which tend to hold the same yieldingly against the face of the disks. The blades are suspended loosely in their holders by means of fastening-pins 14, extending through the walls of the openings at their upper ends and through an enlarged hole in the upper ends of the blades, this construction permitting the latter to have a free movement subject to the action of the springs in the two directions described.

From the foregoing description it is seen that the rocking bar serves as a sole means for supporting the blades and that the latter are movable by this bar in a gang across the face of the disks between their centers and their peripheries. At the same time each blade is movable independently in the direction of the axes of the disks, so that they will at all times accommodate themselves to the changing angles of the plane of the disks. It is further seen that by reason of the rocking motion of the individual blades their ends at all times will lie flatly against the disks, notwithstanding the change in the angles of the plane due to the inward curvature of the same. These independent motions of the blades are further advantageous in that there will be no obstruction to their general movement in the event of one or more of the blades encountering an obstruction on its disk difficult of dislodgment. In such a case the blade will yield and pass over the obstruction, permitting the rocking bar to be moved to effect the cleansing of the remaining disks.

The rocking bar may be operated by any suitable means, such as a hand or foot lever or the like. In the present instance I have shown the rocking bar as having applied to it near its outer end adjacent to the bearing-bracket 4 a foot-lever 15, which bears against the bracket and serves to prevent the rocking bar from moving endwise beyond its proper position.

Having thus described my invention, what I claim is—

1. In a disk harrow the combination with the frame of a series of rotary disks mounted thereon, a series of rocking blade-holders sustained by the frame, a series of scraper-blades each mounted in a holder and movable independently thereof in the direction of the axes of the disks, and a series of springs, one mounted in each holder and bearing on the blade therein and tending to urge the same against its disk; whereby the blades are adapted to be moved in gang across the face of the disks from their centers to the peripheries and are each movable independently in its holder in the direction of the axes of the disks, subject to the action of the springs.

2. In a disk harrow the combination with a series of cutting-disks, of a series of swinging scraper-blades, means for swinging the blades in a gang across the faces of the disks between the centers and peripheries, said blades being each movable independently in the direction of the axes of the disks and also movable independently around the longitudinal axes of the blades, and springs acting on the blades and tending to hold the same in contact with the disks.

3. In a disk harrow the combination with a series of cutting-disks of a rocking bar above the same provided with a series of sockets, scraper-blades each with its upper end extending loosely in a socket, and fastening devices serving to suspend the blades loosely in the sockets.

4. In a disk harrow the combination with a series of rotary disks of a rocking bar thereover, means for rocking the bar, a series of holders on the bar having openings widest at the bottom, a series of scraper-blades having each its upper end extending and loosely secured in the socket, and springs mounted in the holders and bearing on the respective blades.

5. In a disk harrow the combination with a series of disks of a rocking bar thereover, a series of holders applied to the bar, each with an opening to receive a blade and formed each with a socket, a series of blades with their upper ends extending loosely and secured in the openings, and springs seated in the sockets and bearing on the blades.

6. In combination with a series of cutting-disks, a rocking bar thereover, means for rocking the bar, a series of blade-holders applied to the rear face of the bar each with a vertical opening having its sides diverging and inclined outward toward the respective disks, a series of scraper-blades, each with its upper end extending in an opening, fastening devices for the blades, and a series of springs mounted in the holders and bearing on the blades.

7. In a disk harrow the combination with a disk of a rocking bar thereover formed with a socket, a scraper-blade having its upper end extended in the socket, a fastening device for holding the same in the socket, said blade and socket formed relatively to permit the blade to move in the direction of the axis of the disk and also around its own longitudinal axis, and a spring bearing on the blade and tending to hold the same against the disk.

8. In a disk harrow the combination with a series of disks of a rocking bar thereover, a series of blade-holders fixed to the bar each being formed with a vertical opening to receive the blades, said openings being considerably larger than the thickness of the blades to permit them to move therein, a series of blades extending in said opening and each provided in its upper end with an enlarged hole, fastening-pins sustained by the holders and extending in the holes in the blades, and springs also sustained by the holders and bearing on the respective blades; whereby the rocking bar serves as the sole support for the blades which have an independent universal movement subject to the action of the springs.

In testimony whereof I hereunto set my hand, this 14th day of November, 1899, in the presence of two attesting witnesses.

AUGUST LINDGREN.

Witnesses:
C. H. LIPPINCOTT,
C. H. GODEHN.